United States Patent
Mizoguchi et al.

(10) Patent No.: US 10,027,138 B2
(45) Date of Patent: Jul. 17, 2018

(54) CHARGER FOR DETERMINING KIND OF ELECTRONIC APPARATUS ACCEPTABLE IN ACCORDANCE WITH STATE OF CHARGE OF SECONDARY BATTERY

(71) Applicant: FDK CORPORATION, Minato-ku, Tokyo (JP)

(72) Inventors: Yasunari Mizoguchi, Tokyo (JP); Hirohito Teraoka, Tokyo (JP); Kunihisa Sekiguchi, Tokyo (JP); Katsuki Tsuchiya, Tokyo (JP); Kevin Foster, Tokyo (JP)

(73) Assignee: FDK CORPORATION, Tokyo (JP)

( * ) Notice: Subject to any disclaimer, the term of this patent is extended or adjusted under 35 U.S.C. 154(b) by 195 days.

(21) Appl. No.: 15/078,710

(22) Filed: Mar. 23, 2016

(65) Prior Publication Data

US 2016/0285285 A1    Sep. 29, 2016

(30) Foreign Application Priority Data

Mar. 24, 2015 (JP) .................. 2015-060577

(51) Int. Cl.
*H02J 7/00* (2006.01)
(52) U.S. Cl.
CPC .......... *H02J 7/0021* (2013.01); *H02J 7/0052* (2013.01); *H02J 2007/005* (2013.01)
(58) Field of Classification Search
CPC ... H02J 7/0021; H02J 7/0052; H02J 2007/005
See application file for complete search history.

(56) References Cited

U.S. PATENT DOCUMENTS

| | | | | |
|---|---|---|---|---|
| 5,825,155 | A * | 10/1998 | Ito | G01R 19/16542 320/118 |
| 7,195,381 | B2 * | 3/2007 | Lynam | B60K 35/00 362/294 |
| 8,193,771 | B2 * | 6/2012 | Coccio | G01R 31/3634 320/132 |
| 8,638,011 | B2 * | 1/2014 | Robinson | G06F 1/263 307/115 |
| 9,338,836 | B2 * | 5/2016 | Chien | H05B 33/08 |
| 9,513,340 | B2 * | 12/2016 | Doi | G01R 31/3606 |
| 9,660,480 | B2 * | 5/2017 | Yoon | H02J 7/025 |
| 9,726,763 | B2 * | 8/2017 | Dempsey | G01R 31/3689 |
| 2007/0291473 | A1 * | 12/2007 | Traynor | A01K 11/00 362/106 |

(Continued)

FOREIGN PATENT DOCUMENTS

JP            05-152006        6/1993

*Primary Examiner* — Naum B Levin
(74) *Attorney, Agent, or Firm* — Kinney & Lange, P.A.

(57) ABSTRACT

A charger of the present invention includes a charging circuit that allows a secondary battery to be charged, a state-of-charge detection circuit that detects a state of charge of the secondary battery, a pictogram display unit that displays the state of charge of the secondary battery, and a control device that controls the charging circuit and the pictogram display unit on the basis of the state of charge of the secondary battery. The control device determines a kind of electronic apparatus available by the secondary battery in accordance with the state of charge of the secondary battery, and then displays the kind of electronic apparatus available on the pictogram display unit.

5 Claims, 8 Drawing Sheets

(56) References Cited

U.S. PATENT DOCUMENTS

| | | | |
|---|---|---|---|
| 2008/0054845 A1* | 3/2008 | Wang | H02J 7/0042 320/111 |
| 2013/0093428 A1* | 4/2013 | Tinnemeyer | G01R 31/3606 324/426 |
| 2013/0257357 A1* | 10/2013 | Morinaga | H02J 7/0004 320/107 |
| 2014/0324627 A1* | 10/2014 | Haver | G06Q 30/0639 705/26.9 |
| 2015/0349558 A1* | 12/2015 | Toya | H01M 10/44 320/110 |
| 2016/0111905 A1* | 4/2016 | Duncan | H02J 7/0047 320/107 |
| 2016/0172722 A1* | 6/2016 | Rejman | H01M 10/488 362/119 |

\* cited by examiner

CHARGER FOR DETERMINING KIND OF ELECTRONIC APPARATUS ACCEPTABLE IN ACCORDANCE WITH STATE OF CHARGE OF SECONDARY BATTERY

BACKGROUND OF THE INVENTION

Field of the Invention

The present invention relates to a charger of a secondary battery.

Description of the Related Art

A secondary battery, such as a nickel-hydrogen secondary battery, and a lithium-ion secondary battery, can be charged to be repeatedly used, and is widely used in various electronic apparatuses. As a device for charging the secondary battery, for example, a charger that operates by using a commercial alternating current power source for household use, as a power source, is widely used. Thus, the secondary battery provides great convenience in that it can be easily charged anytime at home or the like by using a charger.

While the secondary battery is charged by the charger, the secondary battery cannot be used. Thus, a user cannot use a desired electronic apparatus. In general, it takes a long time to fully charge the secondary battery from an almost used-up state in many cases. On the other hand, even if the secondary battery is not fully charged (such as being charged by about 50%), it can be often used for a certain amount of time depending on a kind of electronic apparatus. In addition, it is deemed that a user may often desire to immediately use the secondary battery even if the secondary battery during charging is in the middle of reaching full charge.

Unfortunately, the secondary battery generally cannot show a state of charge in its appearance. Conventional chargers generally have a function of displaying completion of charge when the secondary battery is fully charged, but do not include a function of displaying a state of charge of the secondary battery during charging. Thus, there is a problem in that the conventional chargers are difficult to appropriately respond to user's needs of immediately using the secondary battery even if the secondary battery is not fully charged.

As an example of prior art to solve this kind of problem, a charger including a circuit that detects a state of charge of a secondary battery during charging as available capacity, and a display device that displays the detection state, is publicly known (refer to Japanese Patent Laid-Open No. H05-152006, for example). The available capacity of the secondary battery during charging in the prior art is displayed by stepwise display of a plurality of LED indicating lights, or a liquid crystal display unit.

Unfortunately, the prior art described above directly displays only a state of charge of the secondary battery, a user does not clearly know what kind of electronic apparatus is available in the state of charge. That is, the prior art described above makes it difficult for the user to understand what kind of electronic apparatus is available at the time when the secondary battery during charging is in the middle of reaching full charge, and thus there is still a problem in usability.

SUMMARY OF THE INVENTION

An aspect of the present invention is directed to a charger that includes a charging circuit that allows a secondary battery to be charged, a state-of-charge detection circuit that detects a state of charge of the secondary battery, a display device that displays the state of charge of the secondary battery, and a control device that controls the charging circuit and the display device on the basis of the state of charge of the secondary battery. The control device determines a kind of electronic apparatus available by the secondary battery in accordance with the state of charge of the secondary battery, and then displays the kind of electronic apparatus available on the display device.

In this way, displaying a kind of electronic apparatus available by the secondary battery on the display device in accordance with a state of charge of the secondary battery enables a user to very easily and immediately understand what kind of electronic apparatus is available in the state of charge. That is, a user can very easily and immediately understand what kind of electronic apparatus is available at the time when the secondary battery during charging is in the middle of reaching full charge. Accordingly, it is possible to achieve excellent usability that meets user's needs of immediately using the secondary battery even if the secondary battery is not fully charged.

As a result, the present invention acquires operation effect of enabling a charger with excellent usability to be provided.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

Embodiments of the present invention will be described below with reference to the accompanying drawings.

First Embodiment of the Present Invention

A first embodiment of the present invention will be described with reference to FIGS. 1 to 7.

Figure 1:
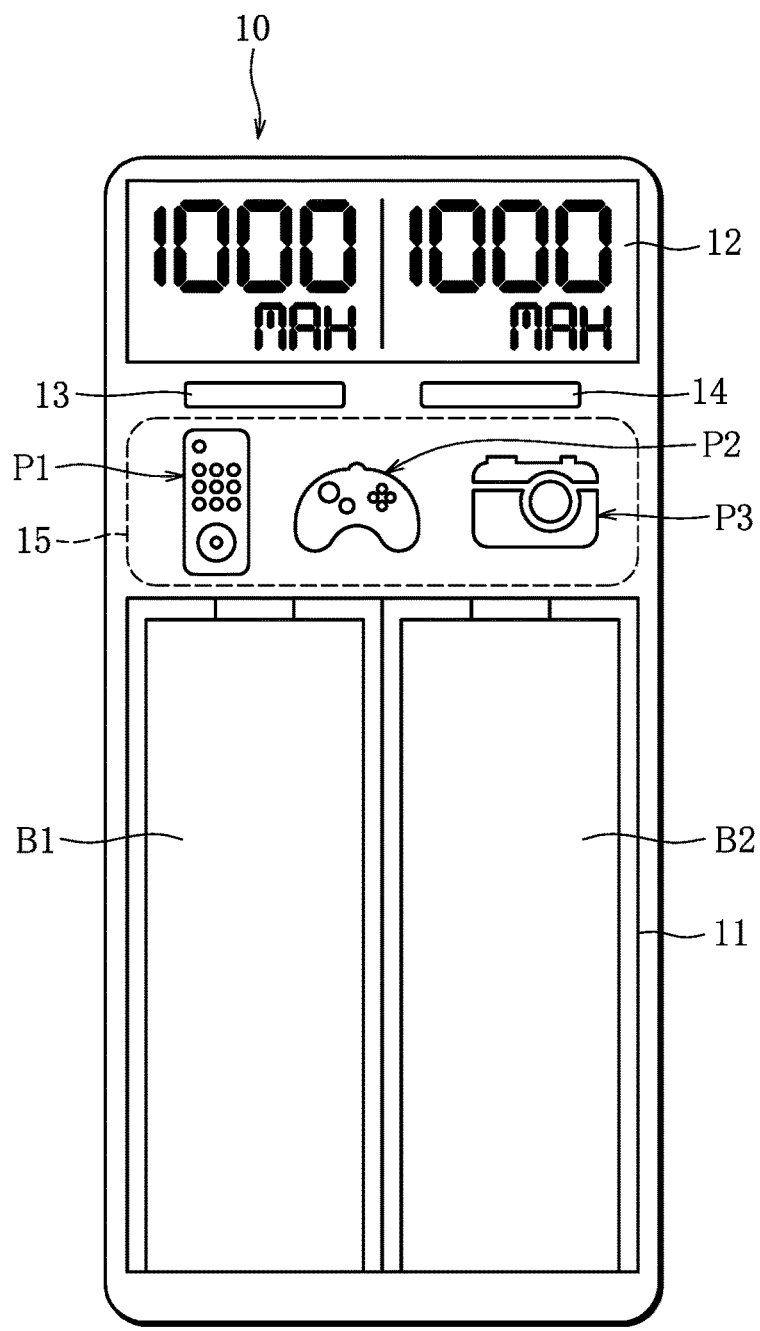
FIG. 1 is a front view illustrating a charger of a first embodiment.

FIG. 1 is a front view illustrating a charger 10 of the first embodiment.

The charger 10 includes a battery support section 11, a liquid crystal display unit 12, a first operation button 13, a second operation button 14, and a pictogram display unit 15.

The battery support section 11 is provided with recessed portions that can accommodate two secondary batteries B1 and B2, and supports the two secondary batteries B1 and B2 accommodated in the recessed portions. The liquid crystal display unit 12 displays information on a state of charge of each of the two secondary batteries B1 and B2. More specifically, the liquid crystal display unit 12, for example, displays a numeric value of the amount of integrated charge of each of the two secondary batteries B1 and B2 in digital characters. The first operation button 13 selectively switches a display mode or the like of information on a state of charge of the secondary battery B1 in display of the liquid crystal display unit 12. The second operation button 14 selectively switches a display mode or the like of information on a state of charge of the secondary battery B2 in display of the liquid crystal display unit 12. The pictogram display unit 15 as a "display device" displays a kind of electronic apparatus available, in first to third pictograms P1 to P3, in accordance with a state of charge of the secondary batteries B1 and B2.

Figure 2:
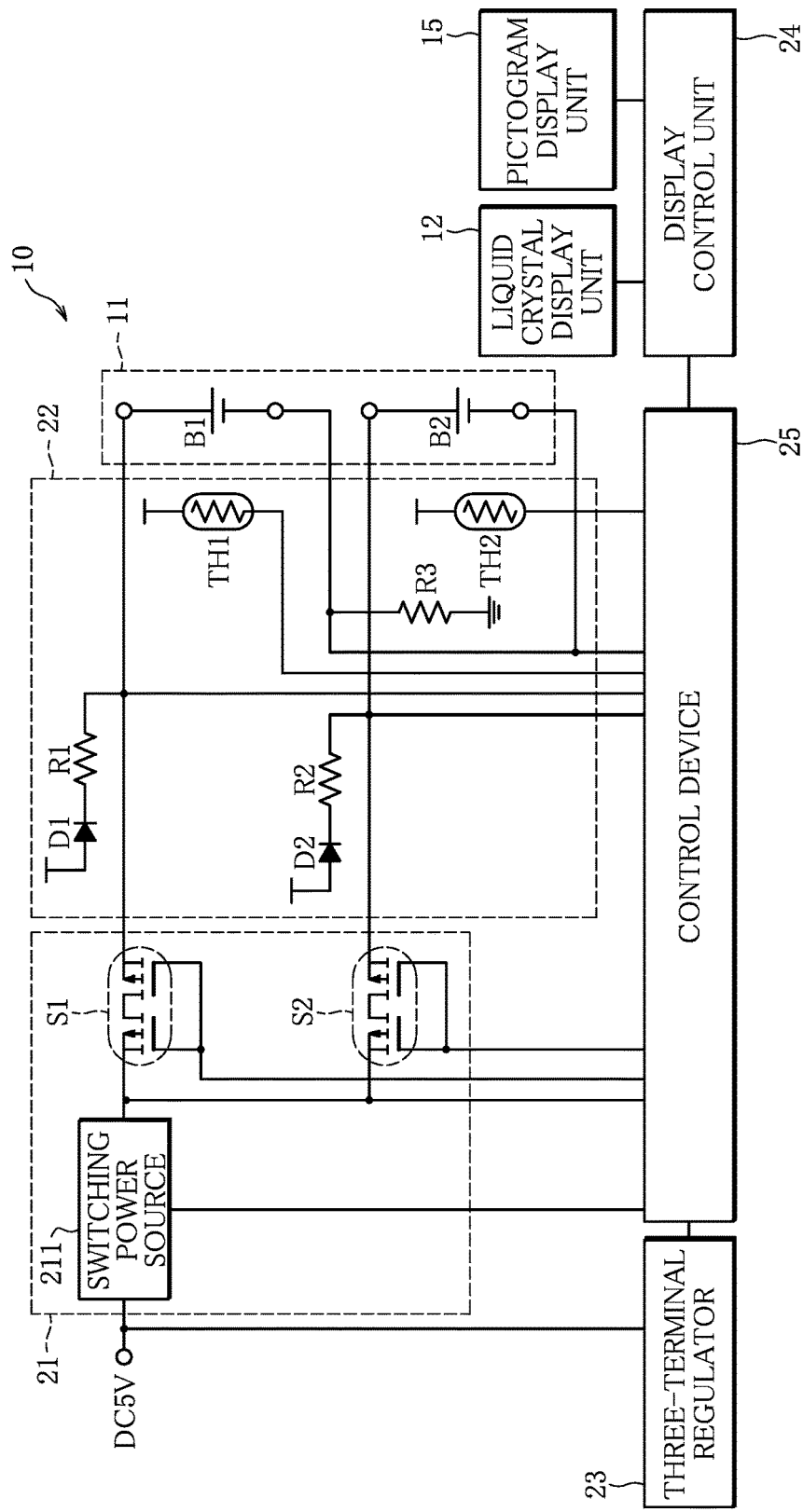
FIG. 2 is a block diagram illustrating a main section of a function block of the charger of the first embodiment.

FIG. 2 is a block diagram illustrating a main section of a function block of the charger 10 of the first embodiment.

The charger 10 includes a charging circuit 21, a state-of-charge detection circuit 22, a three-terminal regulator 23, a display control unit 24, and a control device 25.

The charging circuit 21 allows the secondary batteries B1 and B2 to be charged with direct-current power (such as DC 5V) supplied from the outside. More specifically, the charging circuit 21 includes a switching power source 211, a first switch S1, and a second switch S2. The switching power source 211 is a DC-DC converter that converts direct-current power supplied from the outside into direct-current power of any voltage to output the direct-current power to the secondary batteries B1 and B2. Output voltage of the switching power source 211 is controlled by the control device 25. The first switch S1 as well as the second switch S2, for example, is a power switching element, such as an enhancement type power metal-oxide-semiconductor field-effect transistor (MOSFET), and is controlled by the control device 25. The first switch S1 turns on and off charging of the secondary battery B1. The second switch S2 turns on and off charging of the secondary battery B2.

The state-of-charge detection circuit 22 detects a state of charge of each of the secondary batteries B1 and B2. More specifically, the state-of-charge detection circuit 22 includes two diodes D1 and D2, three resistances R1 to R3, and two thermistors TH1 and TH2. The diode D1 and the resistance R1 constitute a voltage detection circuit that detects voltage of the secondary battery B1. The diode D2 and the resistance R2 constitute a voltage detection circuit that detects voltage of the secondary battery B2. The thermistor TH1 detects temperature of the secondary battery B1. The thermistor TH2 detects temperature of the secondary battery B2. The resistance R3 is a current detection resistance for detecting electric current in the secondary batteries B1 and B2.

The three-terminal regulator 23 converts direct-current power supplied from the outside into direct-current power of a predetermined voltage (such as DC 3 V), and outputs the direct-current power. The display control unit 24 controls display of the liquid crystal display unit 12 as well as the pictogram display unit 15 on the basis of a display control signal outputted from the control device 25. The control device 25 is a publicly known microcomputer control device, and determines a state of charge of the secondary batteries B1 and B2 on the basis of an output signal of the state-of-charge detection circuit 22 (such as voltage, electric current, and temperature, of each of the secondary batteries B1 and B2) to control the charging circuit 21 and the display control unit 24 on the basis of the state of charge of the secondary batteries B1 and B2.

Figure 3:
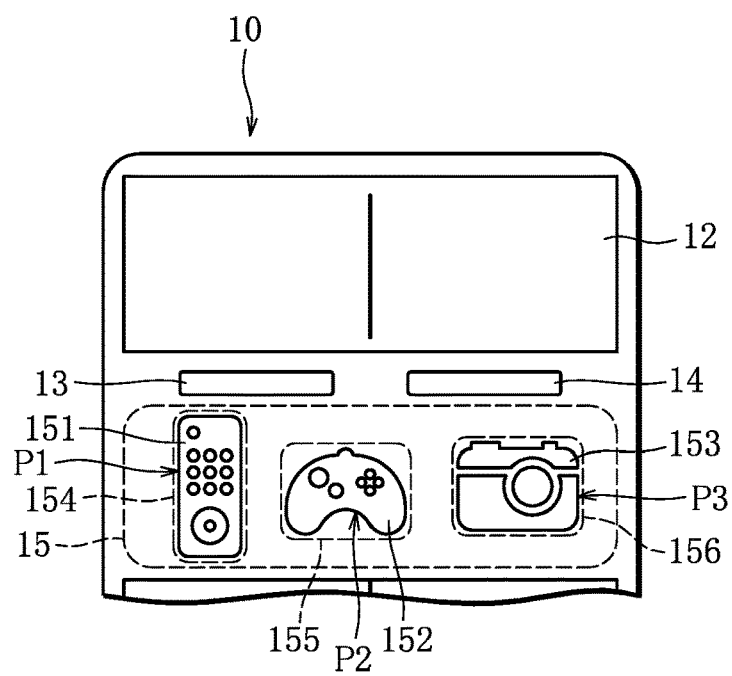
FIG. 3 is an enlarged front view illustrating a pictogram display unit of the charger of the first embodiment.
Figure 4:
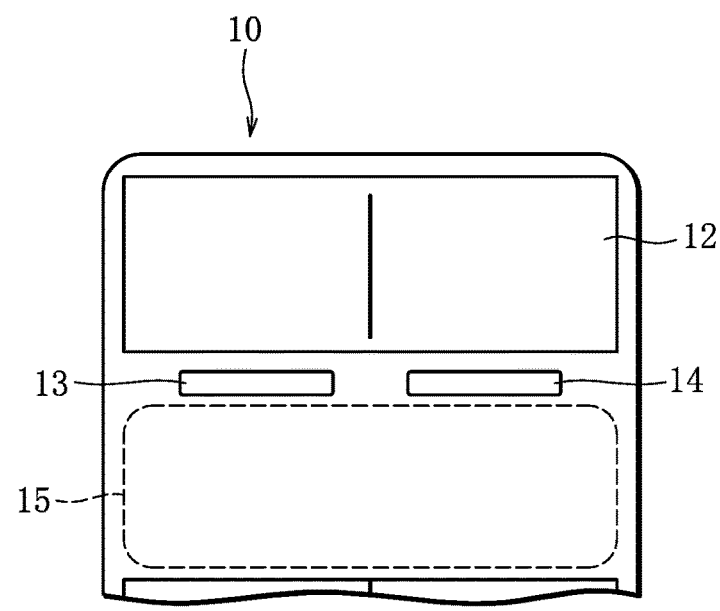
FIG. 4 is a front view illustrating change in display in the pictogram display unit of the first embodiment.
Figure 5:
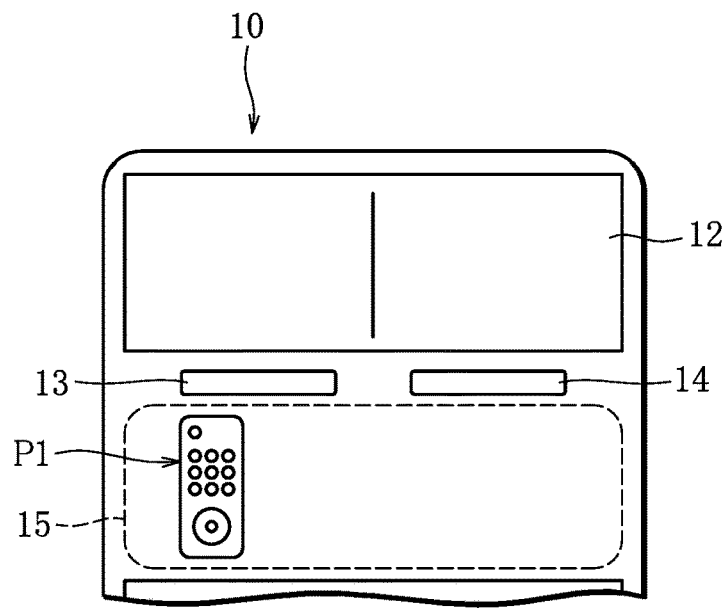
FIG. 5 is a front view illustrating change in display in the pictogram display unit of the first embodiment.
Figure 6:
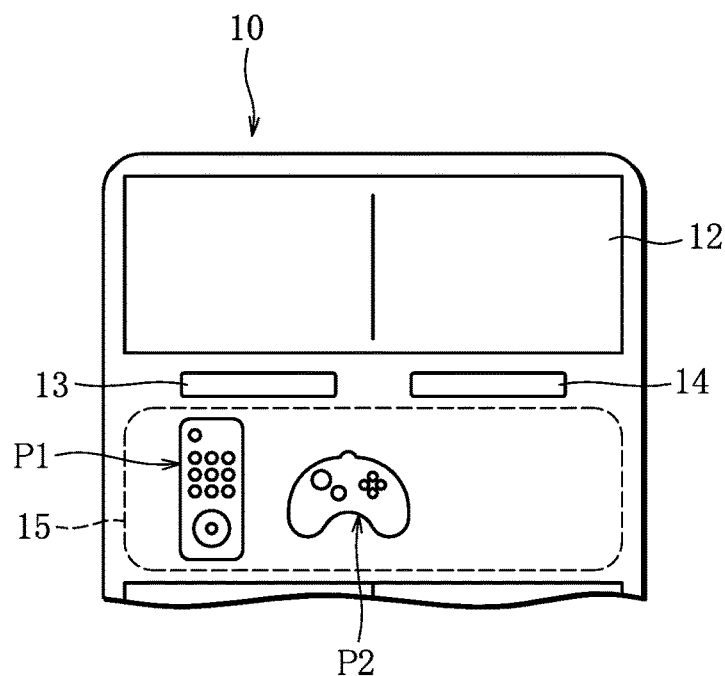
FIG. 6 is a front view illustrating change in display in the pictogram display unit of the first embodiment.
Figure 7:
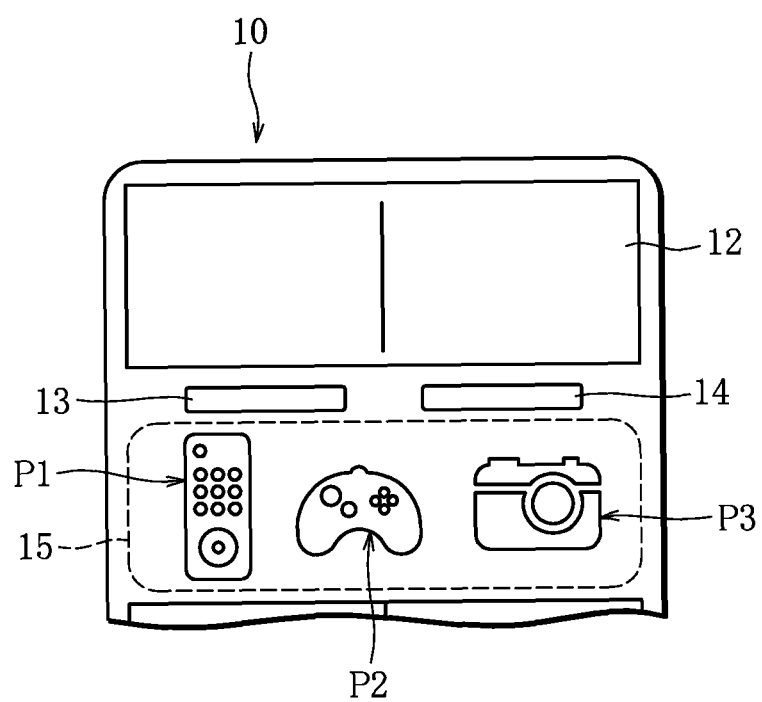
FIG. 7 is a front view illustrating change in display in the pictogram display unit of the first embodiment.

FIG. 3 is an enlarged front view illustrating the pictogram display unit 15 of the charger 10.

The control device 25 determines a kind of electronic apparatus available by the secondary batteries B1 and B2 in accordance with a state of charge of the secondary batteries B1 and B2. Then, the control device 25 displays the kind of electronic apparatus available on the pictogram display unit 15, as described before. More specifically, the pictogram display unit 15 individually displays the first to third pictograms P1 to P3 in accordance with a state of charge of the secondary batteries B1 and B2. The first pictogram P1 is a simplified shape of a remote controller as an example of a kind of electronic apparatus with small power consumption. The second pictogram P2 is a simplified shape of a game controller as an example of a kind of electronic apparatus with middle power consumption. The third pictogram P3 is a simplified shape of a digital camera as an example of a kind of electronic apparatus with large power consumption.

The pictogram display unit 15 of the first embodiment includes first to third light transmission sections 151 to 153, and first to third illuminating sections 154 to 156. The first light transmission section 151 has a shape of the first pictogram P1 (such as a remote controller) to allow the first pictogram P1 to be lit and displayed by being illuminated from the inside. The second light transmission section 152 has a shape of the second pictogram P2 (such as a game controller) to allow the second pictogram P2 to be lit and displayed by being illuminated from the inside. The third light transmission section 153 has a shape of the second pictogram P3 (such as a digital camera) to allow the third pictogram P3 to be lit and displayed by being illuminated from the inside. Each of the first to third illuminating sections 154 to 156, for example, is a light emitting element such as a light emitting diode (LED). The first illuminating section 154 illuminates the first light transmission section 151 from the inside. The second illuminating section 155 illuminates the second light transmission section 152 from the inside. The third illuminating section 156 illuminates the third light transmission section 153 from the inside.

The control device 25 first determines the number of secondary batteries that can be charged. If one secondary battery can be charged, (such as a state where only any one of the secondary batteries B1 and B2 is supported in the battery support section 11), the control device 25 determines a kind of electronic apparatus available in accordance with a state of charge of the one secondary battery (such as the secondary battery B1). On the other hand, if two secondary batteries can be charged, (such as a state where both of the secondary batteries B1 and B2 are supported in the battery support section 11), the control device 25 determines a kind of electronic apparatus available in accordance with a state of charge of the two secondary batteries (such as the secondary batteries B1 and B2).

A state of charge of a secondary battery, for example, can be determined on the basis of the amount of integrated charge of the secondary battery. More specifically, if only the secondary battery B1 can be charged, for example, the control device 25 determines a kind of electronic apparatus available on the basis of the amount of integrated charge of the secondary battery B1. On the other hand, if both of the secondary batteries B1 and B2 can be charged, for example, the control device 25 determines a kind of electronic apparatus available on the basis of an average value of the amounts of integrated charge of the respective secondary batteries B1 and B2. A case where both of the secondary batteries B1 and B2 can be charged will be described below as an example.

Each of FIGS. 4 to 7 is an enlarged front view illustrating the pictogram display unit 15 of the charger 10, and illustrates change in display in the pictogram display unit 15 with respect to a state of charge of the secondary batteries B1 and B2.

The control device 25 turns off all of the first to third illuminating sections 154 to 156 if an average value of the amounts of integrated charge of the secondary batteries B1 and B2 is less than 500 mAH, for example. Thus, the pictogram display unit 15 allows all of the first to third pictograms P1 to P3 to disappear (a light is turned off) (refer to FIG. 4).

Then, the control device 25 turns on the first illuminating section 154 on the condition that an average value of the amounts of integrated charge of the secondary batteries B1 and B2 has reached 500 mAH, for example. Thus, the pictogram display unit 15 allows only the first pictogram P1 to be lit and displayed (refer to FIG. 5).

Generally, a remote controller (the first pictogram P1), as an example of an electronic apparatus with small power consumption, with the amount of 2000 mAH of integrated charge of the secondary batteries B1 and B2 in a fully charged condition, for example, can be used for about one year in many cases. Thus, the amount of 500 mAH of integrated charge is about a quarter of the amount of integrated charge when fully charged to allow a general remote controller to be used for about three months. A period of about three months above is acquired in consideration of so-called a theory of a forgetting curve. It is needless to say that a value of the amount of 500 mAH of integrated charge is only an example, and can be arbitrarily set.

In addition, the control device 25 turns on the second illuminating section 155 along with the first illuminating section 154 on the condition that an average value of the amounts of integrated charge of the secondary batteries B1 and B2 has reached 1000 mAH, for example. Thus, the pictogram display unit 15 allows the first pictogram P1 and the second pictogram P2 to be lit and displayed (refer to FIG. 6).

Generally, a game controller (the second pictogram P2), as an example of an electronic apparatus with middle power consumption, with the amount of 2000 mAH of integrated charge of the secondary batteries B1 and B2 in a fully charged condition, for example, can be used for about 30 hours in many cases. Thus, the amount of 1000 mAH of integrated charge is about a half of the amount of integrated charge when fully charged to allow a general game controller to be used for about 15 hours. A time of about 15 hours above is set to enable the game controller to be used for almost a day except hours of sleep. It is needless to say that a value of the amount of 1000 mAH of integrated charge is only an example, and can be arbitrarily set.

Further, the control device 25 turns on the third illuminating section 156 along with the first and second illuminating sections 154 and 155 on the condition that an average value of the amounts of integrated charge of the secondary batteries B1 and B2 has reached 1500 mAH, for example. Thus, the pictogram display unit 15 allows all of the first to third pictograms P1 to P3 to be lit and displayed (refer to FIG. 7).

Generally, a digital camera (the third pictogram P1), as an example of an electronic apparatus with large power consumption, with the amount of 2000 mAH of integrated charge of the secondary batteries B1 and B2 in a fully charged condition, for example, enables about 300 digital photos to be taken in many cases. Thus, the amount of 1500 mAH of integrated charge is about three-fourths of the amount of integrated charge when fully charged to allow at least 200 or more photos to be taken with a general digital camera. A number of 200 or more above is acquired in consideration of the number of digital photos that can be taken when a general alkali dry battery (primary battery) is used. It is needless to say that a value of the amount of 1500 mAH of integrated charge is only an example, and can be arbitrarily set.

As described above, the charger 10 of the first embodiment displays a kind of electronic apparatus available by the secondary batteries B1 and B2 on the pictogram display unit 15 in accordance with a state of charge of the secondary batteries B1 and B2. Accordingly, a user can very easily and immediately understand what kind of electronic apparatus is available in the state of charge. That is, the user can very easily and immediately understand what kind of electronic apparatus is available at the time when the secondary batteries B1 and B2 during charging are in the middle of reaching full charge. Accordingly, it is possible to achieve excellent usability that meets user's needs of immediately using the secondary batteries B1 and B2 even if the secondary batteries are not fully charged. Thus, the present invention can provide the charger 10 with excellent usability. Accordingly, stress of a user caused by waiting for an electronic apparatus that is unavailable during charging of the secondary batteries B1 and B2 is greatly reduced.

In the present invention, it is preferable that a kind of electronic apparatus available is displayed using a pictogram (the first to third pictograms P1 to P3) as with the first embodiment described above. Accordingly, it is possible to visually and intuitively understand a kind of electronic apparatus available to enable more excellent usability to be achieved. Display of a kind of electronic apparatus available is not particularly limited to a pictogram, and thus any display mode displaying a kind of electronic apparatus is available. For example, an electronic apparatus available may be displayed in characters, using an image, or the like.

In the present invention, it is preferable that the pictogram display unit 15 includes the light transmission sections 151 to 153 formed in the shape of the first to third pictograms P1 to P3, respectively, and the illuminating section 154 to 156 that illuminate the light transmission sections 151 to 153 from the inside, respectively, as with the first embodiment described above. Accordingly, it is possible to display the pictogram of a kind of electronic apparatus available in a state of charge with a simple structure to enable the charger 10 with excellent usability to be realized at low costs.

In the present invention, it is also preferable that a kind of electronic apparatus available is determined from the amount of integrated charge of the secondary batteries B1 and B2, as with the first embodiment described above. Accordingly, it is possible to accurately determine a state of charge of the secondary batteries B1 and B2 in a simple procedure to enable a kind of electronic apparatus available in the state of charge to be accurately determined in a simple procedure.

It is preferable that the charger 10 in accordance with the present invention is configured so that the charging circuit 21 is capable of allowing the plurality of secondary batteries B1 and B2 to be simultaneously charged, and the state-of-charge detection circuit 22 is capable of detecting a state of charge of the plurality of secondary batteries B1 and B2, and also the control device 25 determines a kind of electronic apparatus available by the plurality of secondary batteries B1 and B2 in accordance with the state of charge of the plurality of secondary batteries B1 and B2 to display the kind of electronic apparatus available on the pictogram display unit 15, as with the first embodiment described above. Accordingly, it is possible to accurately determine and display a kind of electronic apparatus available in a state of charge of the plurality of secondary batteries B1 and B2 in electronic apparatuses that simultaneously use the plurality of secondary batteries B1 and B2.

Second Embodiment of the Present Invention

A second embodiment of the present invention will be described with reference to FIGS. 8 to 12.

Figure 8:
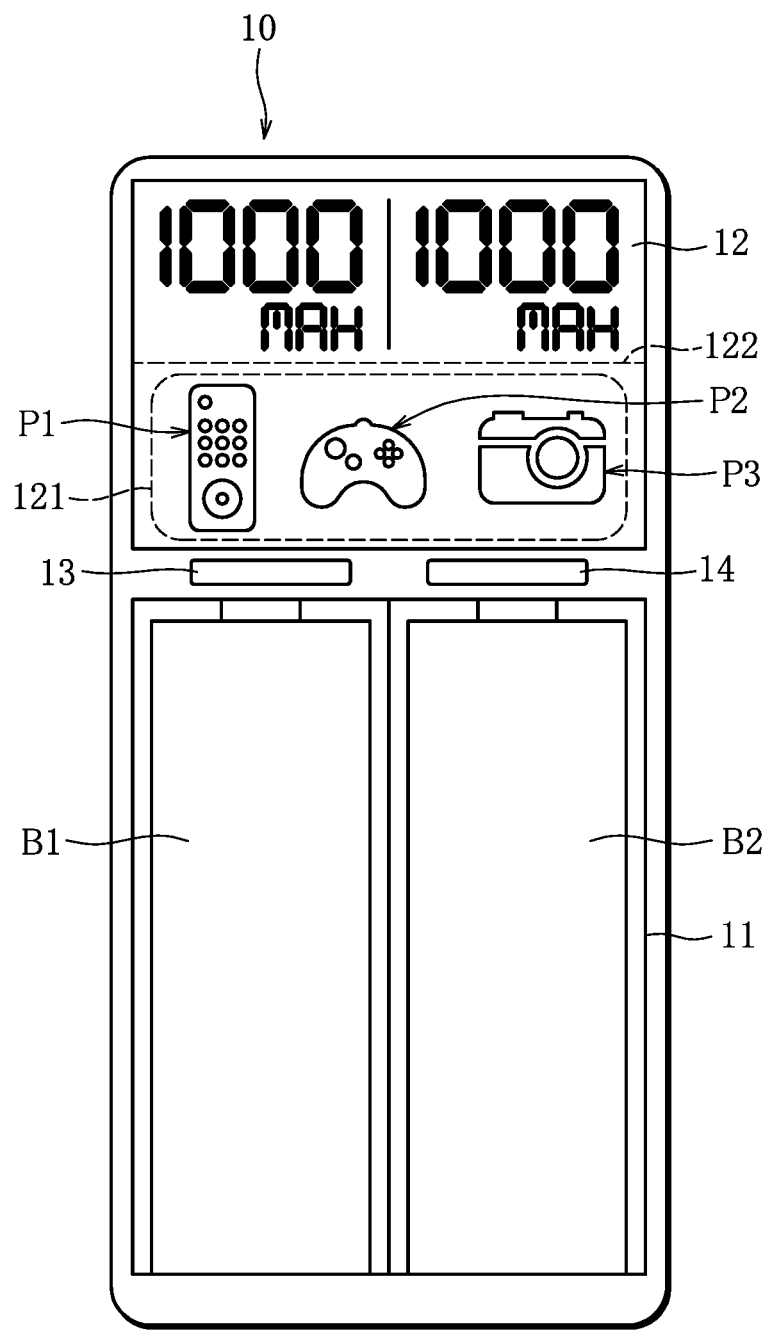
FIG. 8 is a front view illustrating a charger of a second embodiment.

FIG. 8 is a front view illustrating a charger 10 of the second embodiment.

The charger 10 of the second embodiment is different from the configuration of the first embodiment in that an image of each of the first to third pictograms P1 to P3 is displayed in a pictogram display area 121 in the liquid crystal display unit 12 (image display screen) as a "display device", instead of the pictogram display unit 15 of the first embodiment. In addition, the charger 10 of the second embodiment is different from the configuration of the first embodiment in that a level meter display area 122 is set in an area superimposed on the pictogram display area 121 in the liquid crystal display unit 12. The level meter display area 122 allows a ratio (percentage) of an average value of the amounts of integrated charge of the secondary batteries B1 and B2 to full charge to be displayed in a level meter 16 (such as a bar graph) where the full charge is designated as 100%. In this way, displaying a state of charge of the secondary batteries B1 and B2 by using the liquid crystal display unit 12 enables display of a wide variety of information items on a state of charge of the secondary batteries B1 and B2, including display of a kind of electronic apparatus available in the state of charge, and display of another information. As a result, more excellent usability can be achieved.

A configuration other than the above is identical to that of the first embodiment, and the same component is designated by the same reference numeral to omit a detailed description.

Each of FIGS. 9 to 12 is an enlarged front view illustrating the liquid crystal display unit 12 of the charger 10, and illustrates change in display in the pictogram display area 121 and the level meter display area 122, with respect to a state of charge of the secondary batteries B1 and B2.

Figure 9:
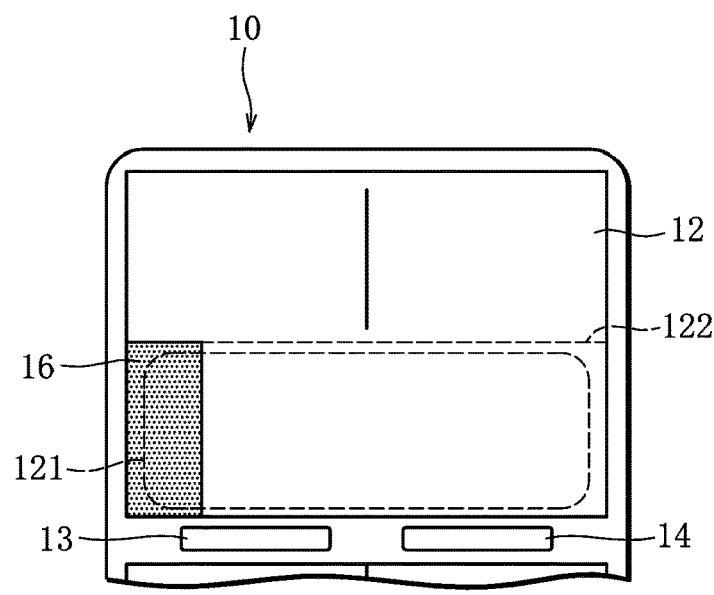
FIG. 9 is a front view illustrating change in display in the pictogram display area of the second embodiment.
Figure 10:
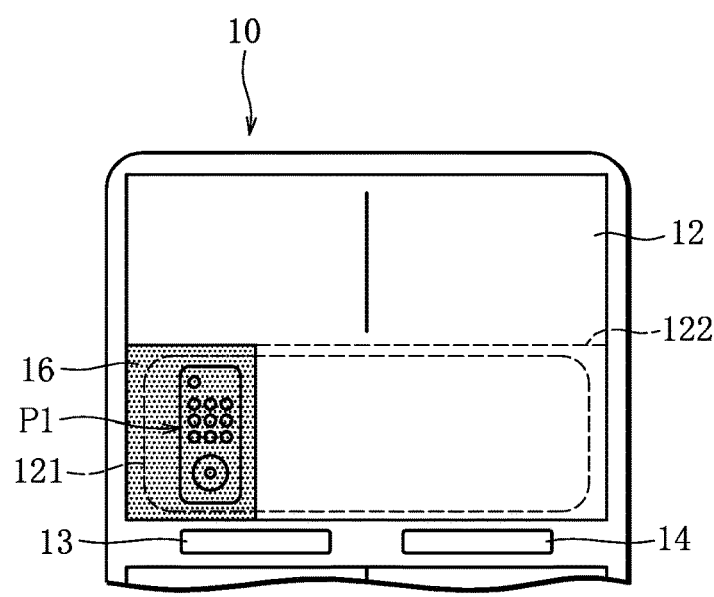
FIG. 10 is a front view illustrating change in display in the pictogram display area of the second embodiment.
Figure 11:
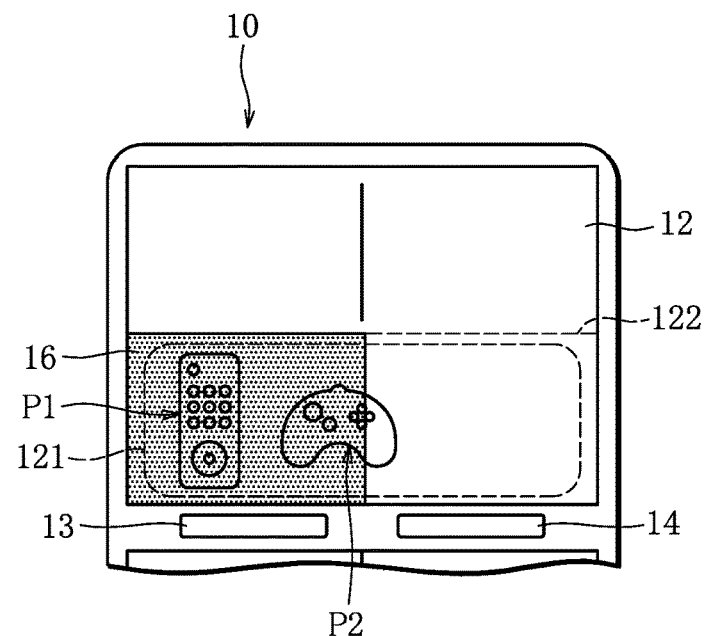
FIG. 11 is a front view illustrating change in display in the pictogram display area of the second embodiment.
Figure 12:
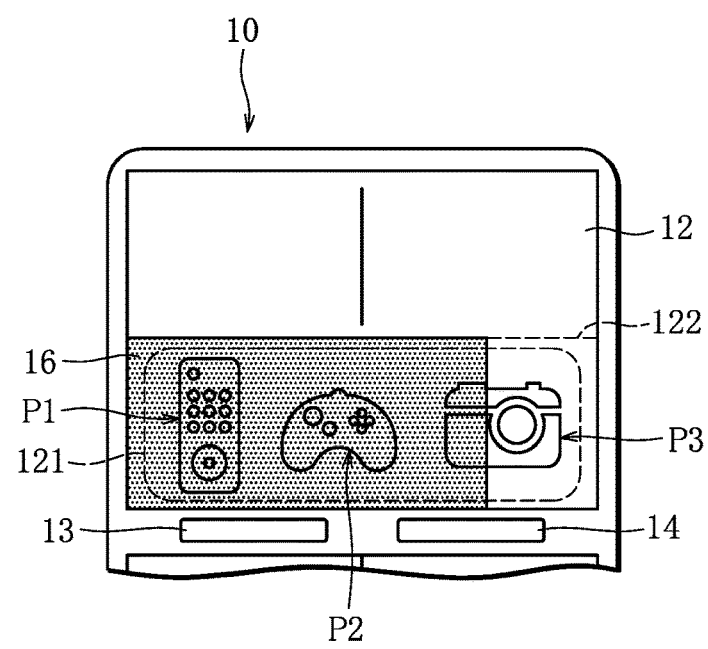
FIG. 12 is a front view illustrating change in display in the pictogram display area of the second embodiment.

The control device 25 allows all of the first to third pictograms P1 to P3 to disappear in the pictogram display area 121 if an average value of the amounts of integrated charge of the secondary batteries B1 and B2 is less than 500 mAH, for example (refer to FIG. 9). The control device 25 also allows the level meter 16 to be displayed with a length corresponding to a ratio of the amount of integrated charge of the secondary batteries B1 and B2 to the full charge in the level meter display area 122 (refer to FIG. 9).

Then, the control device 25 displays the first pictogram P1 in the pictogram display area 121 (refer to FIG. 10) on the condition that an average value of the amounts of integrated charge of the secondary batteries B1 and B2 has reached 500 mAH, for example. The control device 25 also displays the level meter 16 with a length corresponding to a ratio (such as 25%) of the amount of integrated charge of the secondary batteries B1 and B2 to the full charge in the level meter display area 122 (refer to FIG. 10).

In addition, the control device 25 displays the second pictogram P2 in the pictogram display area 121 along with the first pictogram P1 (refer to FIG. 11) on the condition that an average value of the amounts of integrated charge of the secondary batteries B1 and B2 has reached 1000 mAH, for example. The control device 25 also displays the level meter 16 with a length corresponding to a ratio (such as 50%) of the amount of integrated charge of the secondary batteries B1 and B2 to the full charge in the level meter display area 122 (refer to FIG. 11).

Further, the control device 25 displays the third pictogram P3 in the pictogram display area 121 along with the first and second pictograms P1 and P2 (refer to FIG. 12) on the condition that an average value of the amounts of integrated charge of the secondary batteries B1 and B2 has reached 1500 mAH, for example. The control device 25 also displays the level meter 16 with a length corresponding to a ratio (such as 75%) of the amount of integrated charge of the secondary batteries B1 and B2 to the full charge in the level meter display area 122 (refer to FIG. 12).

As described above, the charger 10 of the second embodiment displays a kind of electronic apparatus available by the secondary batteries B1 and B2 in the pictogram display area 121 in the liquid crystal display unit 12 in accordance with a state of charge of the secondary batteries B1 and B2. Accordingly, a user can very easily and immediately understand what kind of electronic apparatus is available in the state of charge. That is, the user can very easily and immediately understand what kind of electronic apparatus is available at the time when the secondary batteries B1 and B2 during charging are in the middle of reaching full charge. Accordingly, it is possible to achieve excellent usability that meets user's needs of immediately using the secondary batteries B1 and B2 even if the secondary batteries are not fully charged. Thus, the present invention can provide the charger 10 with excellent usability. Accordingly, stress of a user caused by waiting for an electronic apparatus that is unavailable during charging of the secondary batteries B1 and B2 is greatly reduced.

In addition, it is preferable that the charger 10 in accordance with the present invention displays not only a kind of electronic apparatus available in a state of charge of the secondary batteries B1 and B2 (first to third pictograms P1 to P3), but also the level meter 16 indicated by a ratio of a state of charge of the secondary batteries B1 and B2 to the full charge in the liquid crystal display unit 12, as with the second embodiment described above. As a result, the charger 10 in accordance with the present invention can achieve more excellent usability. Further, it is preferable that the first to third pictograms P1 to P3 are displayed in display in the liquid crystal display unit 12 while superimposed on display of the level meter 16 in which a state of charge of the secondary batteries B1 and B2 is indicated by a ratio to the full charge, as with the second embodiment described above. Accordingly, a user can understand the state of charge of the secondary batteries B1 and B2 in association with a kind of electronic apparatus available, and thus more excellent usability can be achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

First Aspect of the Present Invention

A first aspect of the present invention is directed to a charger that includes a charging circuit that allows a secondary battery to be charged, a state-of-charge detection circuit that detects a state of charge of the secondary battery, a display device that displays the state of charge of the secondary battery, and a control device that controls the charging circuit and the display device on the basis of the state of charge of the secondary battery. The control device determines a kind of electronic apparatus available by the secondary battery in accordance with the state of charge of the secondary battery, and then displays the kind of electronic apparatus available on the display device.

In this way, displaying a kind of electronic apparatus available by the secondary battery on the display device in accordance with a state of charge of the secondary battery enables a user to very easily and immediately understand what kind of electronic apparatus is available in the state of charge. That is, a user can very easily and immediately understand what kind of electronic apparatus is available at the time when the secondary battery during charging is in the middle of reaching full charge. Accordingly, it is possible to achieve excellent usability that meets user's needs of immediately using the secondary battery even if the secondary battery is not fully charged.

As a result, the first aspect of the present invention acquires operation effect of enabling a charger with excellent usability to be provided.

Second Aspect of the Present Invention

A second aspect of the present invention is the charger in the first aspect of the present invention described before, in which the display device displays the kind of electronic apparatus available with a pictogram.

The second aspect of the present invention displays a kind of electronic apparatus available in a state of charge with a pictogram to enable the kind of electronic apparatus available to be visually and intuitively understood. As a result, more excellent usability can be achieved.

Third Aspect of the Present Invention

A third aspect of the present invention is the charger in the second aspect of the present invention described before, in which the display device includes a light transmission section formed in a shape of the pictogram, and an illuminating section that illuminates the light transmission section from the inside.

The third aspect of the present invention can display a pictogram of a kind of electronic apparatus available in a state of charge with a simple structure to enable a charger with excellent usability to be realized at low costs.

Fourth Aspect of the Present Invention

A fourth aspect of the present invention is the charger in any one of the first to third aspects of the present invention described before, in which the display device includes an image display screen.

The fourth aspect of the present invention uses a display device including the image display screen to enable display of a wide variety of information items on a state of charge of the secondary battery, including display of a kind of electronic apparatus available in the state of charge, and display of another information. As a result, more excellent usability can be achieved.

Fifth Aspect of the Present Invention

A fifth aspect of the present invention is the charger in the fourth aspect of the present invention described before, in which the display device displays a level meter in which a state of charge of the secondary battery is indicated by a ratio to full charge, in the image display screen.

The fifth aspect of the present invention displays not only a kind of electronic apparatus available in a state of charge, but also the level meter in which the state of charge of the secondary battery is indicated by a ratio to full charge. As a result, more excellent usability can be achieved.

Sixth Aspect of the Present Invention

A sixth aspect of the present invention is the charger in the fifth aspect of the present invention described before, in which the display device displays the kind of electronic apparatus available in the image display screen by superimposing the kind of electronic apparatus on display of the level meter.

The sixth aspect of the present invention allows a user to understand a state of charge of the secondary battery in association with a kind of electronic apparatus available to enable more excellent usability to be achieved.

Seventh Aspect of the Present Invention

A seventh aspect of the present invention is the charger in any one of the first to sixth aspects of the present invention described before, in which the control device determines the kind of electronic apparatus available from the amount of integrated charge of the secondary battery.

The seventh aspect of the present invention can accurately determine a state of charge of the secondary battery in a simple procedure to enable a kind of electronic apparatus available in the state of charge to be accurately determined in a simple procedure.

Eighth Aspect of the Present Invention

A eighth aspect of the present invention is the charger in any one of the first to seventh aspects of the present invention described before, in which the charging circuit is capable of allowing a plurality of secondary batteries to be simultaneously charged, and the state-of-charge detection circuit is capable of detecting a state of charge of the plurality of secondary batteries, and also the control device determines a kind of electronic apparatus available by the plurality of secondary batteries in accordance with the state of charge of the plurality of secondary batteries to display the kind of electronic apparatus available on the display device.

The eighth aspect of the present invention can accurately determine and display a kind of electronic apparatus available in a state of charge of the plurality of secondary batteries in electronic apparatuses that simultaneously use the plurality of secondary batteries.

What is claimed is:
1. A charger comprising:
a charging circuit that allows a secondary battery to be charged;
a state-of-charge detection circuit that detects state of charge of the secondary battery;
a display device that includes an image display screen comprising a first display area and a second display area, wherein the first display area displays a kind of electronic apparatus available based upon a state of charge of the secondary battery, and the second display area is superimposed on the first display area, and displays a level meter in which the state of charge of the secondary battery is indicated by a ratio to full charge; and a control device that controls the charging circuit and the display device on the basis of the state of charge of the secondary battery, wherein the control device determines a kind of electronic apparatus available by the secondary battery in accordance with the state of charge of the secondary battery, and wherein the display device displays the kind of electronic apparatus determined by the control device on the first display area and displays the level meter on the second display area.

2. The charger according to claim 1, wherein the display device displays the kind of electronic apparatus available with a pictogram.

3. The charger according to claim 2, wherein the display device includes a light transmission section formed in a shaped of the pictogram, and an illuminating section that illuminates the light transmission section from the inside.

4. The charger according to claim 1, wherein the control device determines the kind of electronic apparatus available from the amount of integrated charge of the second battery.

5. The charger according to claim 1, wherein the charging circuit is capable of allowing a plurality of secondary batteries to be simultaneously charged, and wherein the state-of-charge detection circuit is capable of detecting a state of charge of the plurality of secondary batteries, and also wherein the control device determines a kind of electronic apparatus available by the plurality of secondary batteries.

\* \* \* \* \*